J. M. ADAMS.
JOINT FOR METAL BEDS.
APPLICATION FILED FEB. 23, 1909.
932,233.  Patented Aug. 24, 1909.
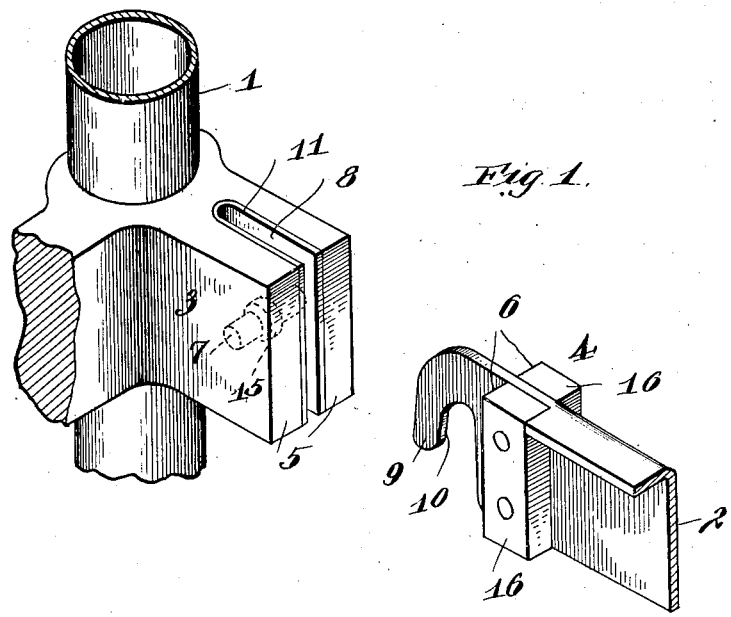
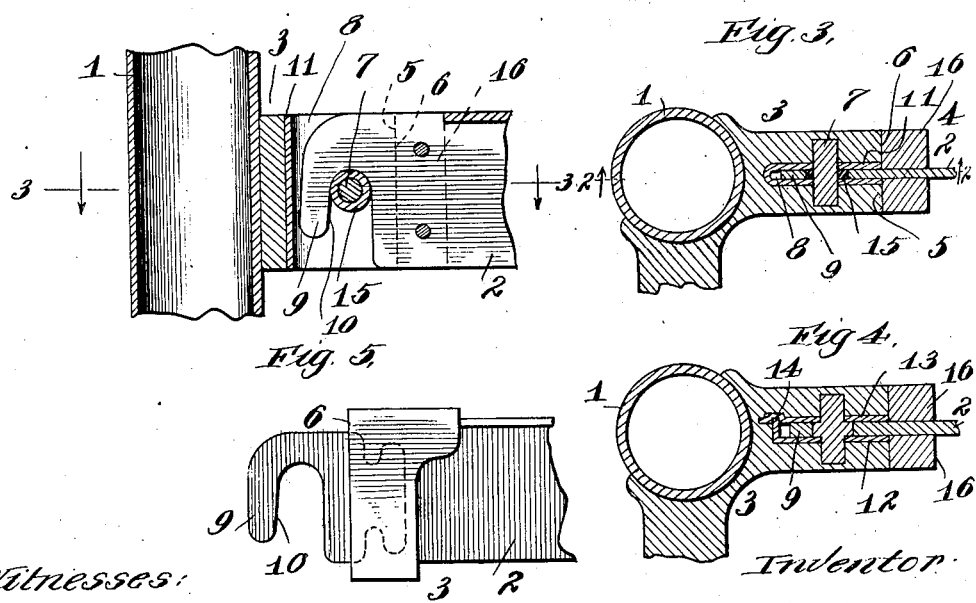
Witnesses:
Inventor
John M. Adams,
By Geo. W. E. Waldo,
Atty

UNITED STATES PATENT OFFICE.

JOHN M. ADAMS, OF CHICAGO, ILLINOIS.

JOINT FOR METAL BEDS.

932,233.          Specification of Letters Patent.     Patented Aug. 24, 1909.

Application filed February 23, 1909. Serial No. 479,334.

*To all whom it may concern:*

Be it known that I, JOHN M. ADAMS, a citizen of the United States, and a resident of Chicago, Cook county, Illinois, have invented certain new and useful Improvements in Joints for Metal Beds, of which the following is a specification.

This invention relates to joints for metal bedsteads and relates particularly to corner fastenings for securing side and end frame members to the bed posts.

The object of the present invention is to provide a joint for this purpose which shall be simple and relatively inexpensive, as regards construction; which shall present a neat and attractive appearance; and which shall combine the features of strength, durability and rigidity.

To this end a joint of my invention comprises the various features and details of construction hereinafter described and claimed.

In the accompanying drawing, in which my invention is fully illustrated—Figure 1 is a perspective view showing my improved joint for connecting a side rail to a post of a metal bedstead, the joint members being disengaged. Fig. 2 is a vertical, sectional view on the line 2—2 of Fig. 3. Fig. 3 is a transverse sectional view on the line 3—3 of Fig. 2. Fig. 4 is a view, similar to Fig. 3, of a modified form of my improved joint; and Fig. 5 is a side view of a side rail joint-member embodying my invention in slightly modified form.

While, as previously stated, a joint of my invention is designed and adapted for connecting side and end frame members of a bedstead to the bed posts, generally, for purposes of illustration, I have, in the drawings, shown a specific application of my improved joint as forming a corner fastening for securing a side rail to the post of a bedstead.

Referring now to the drawing, 1 designates the post of a metal bedstead, 2 a side rail thereof, and 3 and 4 corner fastening members, on said post 1 and the side rail 2, respectively. Said corner fastening members 3 and 4 are provided with interlocking members adapted for securing the same rigidly together and with opposed faces or surfaces 5 and 6, respectively, constructed and arranged to abut against each other when the interlocking members of said corner fastening members are fully engaged.

The means for interlocking the corner fastening members 3 and 4 comprise a pin 7 secured in or to the corner fastening member 3 and which extends across a slot 8 therein which extends inwardly from the abutting face 5 thereof, and a hook 9 on the side rail adapted to be inserted into the slot 8 and engaged with the pin 7, the under surface 10 of said hook being inclined upwardly toward the base of said hook so as to exert a cam action tending to draw the corner fastening members together when said hook 9 is engaged with the pin 7.

The slot 8 is formed by means of a plate 11, the adjacent sides of which define said slot and which is rigidly secured in said corner fastening member 3, preferably by the operation of casting. The plate 11 may consist either of a single integral piece of sheet metal stamped into proper shape, as shown in Figs. 1 to 3, or it may consist of separate pieces 12 and 13, one of which, as shown, the part 12, being formed with a flange on its rear end adapted to engage a suitable groove 14 in the part 13, said flange being of such length as to define the proper width of the slot 8, all as shown in Fig. 4. My invention, however, contemplates equally forming said plate 11 from suitable cast metal, as malleable iron, if desired.

The sides of the plate 11 are spaced apart to define the proper width of the slot 8 by means of shoulders on the pin 7. Where the plate 11 consists of a single integral piece, the shoulders which define the width of the slot 8 are preferably formed by the ends of a sleeve or thimble 15 inserted over the pin proper 7. Where, however, the plate 11 is made in separate parts, as shown in Fig. 4, said shoulders may be formed directly on said pin by reducing the ends thereof.

Where the outer sides of the plate 11 are plain and smooth, the pin 7 will preferably be made of such length that its ends will project outwardly beyond the outer sides of said plate and will be embedded in the body portion of said corner fastening member when the same is cast. If, however, said plate 11 is provided on its outer surfaces with projecting parts adapted to interlock with the cast body portion of said corner fastening member, the ends of the pin 7 may be riveted into said plate so that the ends thereof will be substantially flush with the outer sides of said plate.

Where the side rail 2 is made of angle iron, as is ordinarily the case, the hook 9 is preferably formed integral with the flange of said side rail which is disposed vertically when said corner fastening members are interlocked. This can be conveniently effected by cutting away the other flange of said side rail a sufficient distance to form said hook, which may then be stamped or cut in any approved manner. With this construction, also, the abutting face 6 of the corner fastening member on said side rail is preferably formed by means of metal plates 16 riveted, or otherwise rigidly secured to the sides of said hook at the base thereof. My invention, however, contemplates equally making said hooks in the form of separate pieces, as shown in Fig. 5, and securing them to the side rail by means of cast metal abutments, said abutments being so shaped that the end thereof from which said hook 9 projects, will form the abutting surface 6 of said corner fastening member.

I claim:—

1. A joint for connecting parts of metal bedsteads, comprising a slotted joint-member cast upon one of said connected parts, a plate cast into said slotted member which defines the slot therein, a pin which extends across said slot the ends of which are secured in said plate, a hook on the other joint-member adapted for engagement with the pin in said slotted joint-member, said joint-members being provided with opposed surfaces adapted to abut against each other when said hook is in full engagement with said pin, substantially as described.

2. A joint for connecting parts of metal bedsteads, comprising a slotted joint-member cast upon one of said connected parts, a plate cast into said slotted member which defines the slot therein, a pin which extends across said slot the ends of which project through holes or openings in said plate beyond the outer sides thereof and are embedded in the cast portion of said joint-member, a hook on the other joint-member adapted for engagement with the pin in said slotted joint-member, said joint-members being provided with opposed surfaces adapted to abut against each other when said hook is in full engagement with said pin, substantially as described.

3. A joint for connecting parts of metal bedsteads, comprising a slotted joint-member cast upon one of said connected parts, a plate cast into said slotted member which defines the slot therein, a shouldered pin which extends across said slot the ends of which are secured in said plate and the shoulders on which bear against the inner sides of said plate and determine the width of the slot defined thereby, a hook on the other joint-member adapted for engagement with the pin in said slotted joint-member, said joint-members being provided with opposed surfaces adapted to abut against each other when said hook is in full engagement with said pin, substantially as described.

4. A joint for connecting parts of metal bedsteads, comprising a slotted joint-member cast upon one of said connected parts, a plate cast into said slotted member which defines the slot therein, a shouldered pin which extends across said slot the ends of which project through holes or openings in said plate beyond the outer sides thereof and are embedded in the cast portion of said joint-member, the shoulders on said pin bearing against the inner sides of said plate and determining the width of the slot defined thereby, a hook on the other joint-member adapted for engagement with the pin in said slotted joint-member, said joint-members being provided with opposed surfaces adapted to abut against each other when said hook is in full engagement with said pin, substantially as described.

5. A joint for connecting parts of a metal bedstead, one of which is made of angle-iron, said joint comprising a hook formed integral with one flange of said angle-iron member and a slotted member secured to the other of said connected parts, a pin which extends across said slot adapted for engagement by the hook on said angle-iron member and opposed surfaces on said joint-members adapted to abut against each other when said hook and pin are in full engagement, the abutting surfaces on said angle-iron member being formed by separate ribs rigidly secured to the sides of said hook at the base thereof.

In testimony, that I claim the foregoing as my invention, I affix my signature in presence of two subscribing witnesses, this 17th day of February, 1909.

JOHN M. ADAMS.

Witnesses:
K. A. COSTELLO,
E. L. NICHOLSON.